United States Patent
Wang et al.

(10) Patent No.: US 11,308,043 B2
(45) Date of Patent: Apr. 19, 2022

(54) DISTRIBUTED DATABASE REPLICATION

(71) Applicant: Salesforce.com, Inc., San Francisco, CA (US)

(72) Inventors: Xiaodan Wang, Dublin, CA (US); Mikhail Chainani, San Francisco, CA (US)

(73) Assignee: salesforce.com, Inc., San Francisco, CA (US)

( * ) Notice: Subject to any disclaimer, the term of this patent is extended or adjusted under 35 U.S.C. 154(b) by 281 days.

(21) Appl. No.: 16/681,922

(22) Filed: Nov. 13, 2019

(65) Prior Publication Data

US 2021/0141770 A1    May 13, 2021

(51) Int. Cl.
| | | |
|---|---|---|
| *G06F 16/00* | (2019.01) | |
| *G06F 11/00* | (2006.01) | |
| *G06F 16/182* | (2019.01) | |
| *G06F 16/185* | (2019.01) | |
| *G06F 16/178* | (2019.01) | |
| *G06F 11/14* | (2006.01) | |
| *G06F 11/20* | (2006.01) | |

(Continued)

(52) U.S. Cl.
CPC ...... *G06F 16/1844* (2019.01); *G06F 11/1451* (2013.01); *G06F 11/1464* (2013.01); *G06F 11/203* (2013.01); *G06F 11/2028* (2013.01); *G06F 16/178* (2019.01); *G06F 16/185* (2019.01); *G06F 16/2358* (2019.01); *G06F 16/2365* (2019.01); *G06F 16/2379* (2019.01); *G06F 16/27* (2019.01); *G06F 16/278* (2019.01)

(58) Field of Classification Search
CPC .... G06F 16/27; G06F 16/278; G06F 16/1844; G06F 16/2358; G06F 16/2365; G06F 16/2379; G06F 16/178; G06F 11/1451; G06F 11/1464; G06F 11/2028; G06F 11/203; G06F 16/185
See application file for complete search history.

(56) References Cited

U.S. PATENT DOCUMENTS

| | | | | |
|---|---|---|---|---|
| 8,937,959 B2 * | 1/2015 | Basso | ...................... | H04L 45/16 370/396 |
| 9,268,605 B2 | 2/2016 | Wang et al. | | |

(Continued)

FOREIGN PATENT DOCUMENTS

| | | |
|---|---|---|
| CA | 2883883 C | 9/2019 |
| EP | 1452983 A2 * | 9/2004 |

(Continued)

*Primary Examiner* — Srirama Channavajjala
(74) *Attorney, Agent, or Firm* — Kwan & Olynick LLP

(57) ABSTRACT

A request may be received to relocate source data within a distributed database system arranged in a hierarchy composed of a plurality of levels. The plurality of levels may include a local level that includes a plurality of pods, which may be end points in the hierarchy. The data may be stored at a source pod. The request may identify a designated level in the hierarchy at which to relocate the source data. A target pod within the distributed database system may be selected. The source pod and the target pod may be located remotely from one another. The data may be replicated to the target pod via a local change bus in communication with the source pod. The local change bus may capture changes made to data stored in the source pod and transmit the captured changes to the target pod via the hierarchy.

14 Claims, 10 Drawing Sheets

(51) Int. Cl.
*G06F 16/23* (2019.01)
*G06F 16/27* (2019.01)

(56) References Cited

U.S. PATENT DOCUMENTS

| | | | |
|---|---|---|---|
| 9,288,148 B1 * | 3/2016 | Krishnaswamy | ... H04L 41/0893 |
| 9,348,648 B2 | 5/2016 | Wang et al. | |
| 9,529,626 B2 | 12/2016 | Wang et al. | |
| 9,632,852 B2 | 4/2017 | Kwong et al. | |
| 9,766,960 B2 | 9/2017 | Wang | |
| 9,813,516 B2 | 11/2017 | Wang | |
| 10,013,294 B2 | 7/2018 | Kwong et al. | |
| 10,140,153 B2 | 11/2018 | Wang | |
| 10,169,090 B2 | 1/2019 | Wang | |
| 10,235,090 B1 * | 3/2019 | Baruch | ... G06F 11/14 |
| 2002/0184239 A1 * | 12/2002 | Mosher, Jr. | ... G06F 11/1474 |
| 2007/0214314 A1 * | 9/2007 | Reuter | ... G06F 3/067 |
| | | | 711/114 |
| 2008/0256138 A1 * | 10/2008 | Sim-Tang | ... G06F 16/128 |
| 2013/0086005 A1 * | 4/2013 | Mori | ... G06F 16/282 |
| | | | 707/690 |
| 2014/0075017 A1 | 3/2014 | Wang et al. | |
| 2015/0046279 A1 | 2/2015 | Wang | |
| 2016/0013949 A1 * | 1/2016 | Johri | ... H04L 12/18 |
| | | | 370/390 |
| 2016/0048408 A1 * | 2/2016 | Madhu | ... G06F 11/2023 |
| | | | 718/1 |
| 2016/0119244 A1 | 4/2016 | Wang et al. | |
| 2016/0119246 A1 | 4/2016 | Wang | |
| 2017/0060975 A1 * | 3/2017 | Akyureklier | ... G06F 11/2048 |
| 2018/0063271 A1 | 3/2018 | Wang | |
| 2018/0329793 A1 | 11/2018 | Obembe et al. | |
| 2018/0331887 A1 | 11/2018 | Obembe et al. | |
| 2019/0057133 A1 | 2/2019 | Chainani et al. | |
| 2019/0065542 A1 | 2/2019 | Baker et al. | |
| 2019/0095249 A1 | 3/2019 | Wang | |
| 2019/0235895 A1 | 8/2019 | Ovesea et al. | |
| 2019/0235918 A1 | 8/2019 | Liu et al. | |
| 2019/0236150 A1 | 8/2019 | Zaslavsky et al. | |
| 2019/0236201 A1 | 8/2019 | Wang et al. | |

FOREIGN PATENT DOCUMENTS

| WO | WO2004025498 A1 * | 3/2004 |
|---|---|---|
| WO | WO2015031755 A1 * | 3/2015 |

* cited by examiner

US 11,308,043 B2

DISTRIBUTED DATABASE REPLICATION

FIELD OF TECHNOLOGY

This patent document relates generally to database systems and more specifically to distributed database replication.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

One type of cloud computing system is an on-demand database system. In an on-demand database system, clients of a service provider access database services through the internet. Such database systems are often distributed across multiple machines, data centers, and/or geographic locations. Distributed database systems can be architected so as to improve failure tolerance, reduce access latency, and increase bandwidth. For example, a client's data may be stored in a data centered located in an area geographically proximate to the client. As another example, if one data center suffers from a service disruption, service may be shifted to a different data center.

BRIEF DESCRIPTION OF THE DRAWINGS

The included drawings are for illustrative purposes and serve only to provide examples of possible structures and operations for the disclosed inventive systems, apparatus, methods and computer program products for database system replication. These drawings in no way limit any changes in form and detail that may be made by one skilled in the art without departing from the spirit and scope of the disclosed implementations.

DETAILED DESCRIPTION

Figure 1:
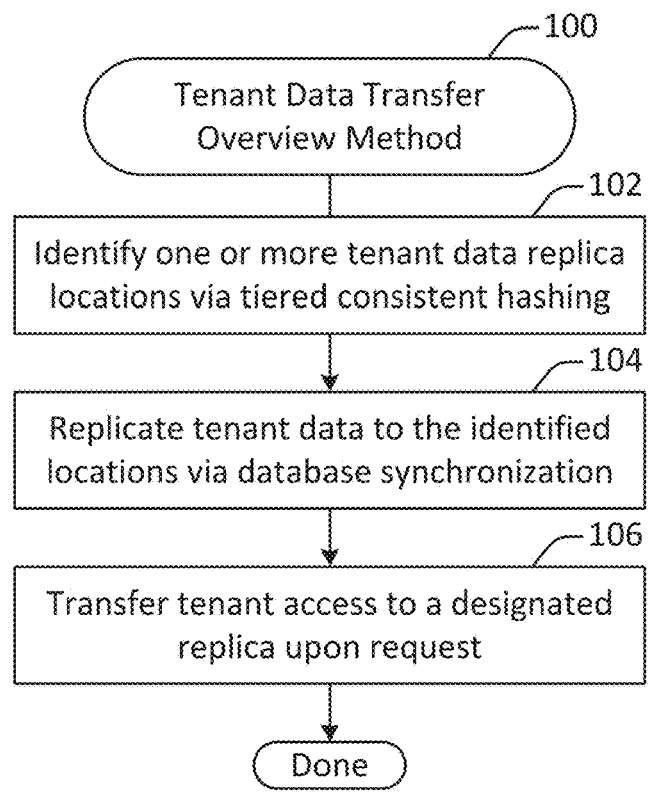
FIG. 1 illustrates an example of an overview method for tenant data transfer, performed in accordance with one or more embodiments.

A computing services provider may provide on-demand database services to a variety of clients via the internet. The database system may be implemented in a distributed fashion. For example, a single database system may be implemented across different geographic zones, each of which may include one or more different data centers. Within a data center, the database system may be divided further into logical units, referred to herein as pods, which may each include one or more physical machines.

In a distributed database system, database requests associated with a particular tenant are typically handled by a particular portion of the system. For example, although the tenant may be associated with data distributed across the system, the tenant may communicate with a particular pod in a particular data center in order to access the database system.

In some instances, it is desirable to transfer the tenant's access point from one location (e.g., a first pod) to another location (e.g., a second pod). For example, the first pod may be located in a data center experiencing a service disruption. As another example, the second pod may offer improved response times.

When employing conventional techniques, migrating database services for a customer from one location to another location incurs significant operational overhead, which can limit the ability to scale the frequency of such migrations. For example, when employing conventional techniques, service disruption and disaster recovery failover techniques are often implemented at the pod level, limiting the ability to transfer individual tenants. Further, a replacement pod having comparable infrastructure must be provisioned at a failover data center, increasing the need for computing resources and therefore the service costs incurred by tenants. As another example, tenant transfers may impose significant downtime during which the transfer is enacted and the tenant is unable to access the database. As still another example, tenant transfers may require substantial manual activity by database administrators associated with the service provider.

In contrast to conventional approaches, techniques and mechanisms described herein provide for rapid and seamless transfer of tenant database access between locations. In some embodiments, a tenant may execute such a request at a moment's notice and in a self-service manner. Furthermore, the system may be configured to support many (e.g., tens of thousands) of such transfer requests in rapid succession without incurring a service disruption.

According to various embodiments, techniques and mechanisms described herein provide for an approach to tenant placement and replica management within a distributed database system. Full copies of tenants' data may be created to enable various use cases, such as disaster recovery, instance refreshing, and/or tenant migration. Disaster recovery refers to the ability to restore service availability in the event of a pod or data center level failure (e.g. catastrophic hardware failure). Instance refresh refers to the operation in which an existing pod is retired by migrating tenants to other pods. Tenant migration refers to the transfer of an individual tenant to a different Pod in order to, for instance, balance load or reduce contention between tenants.

According to various embodiments, techniques and mechanisms described herein provide for the improved architecture and management of an improved distributed database. For example, tenants may customize replicas at different hierarchical levels, such as local, regional, and/or global scales. As another example, a system may be configured with automated, tiered replica placement and failover decisions to better distribute tenants across geographies and provide higher availability guarantees with minimal manual interaction. As still another example, hierarchical replication through replication policy nodes may be used to enable efficient, large scale synchronization of replicas. As yet another example, new database functionality may be provided, such as per-tenant high availability data replicas. As still another example, disaster recovery services may be provided with fewer computational resources by avoiding duplicative provisioning and instead only provisioning excess capacity at a level sufficient to accommodate the expected number of simultaneous failures globally or within a designated region. As yet another example, read-only user requests can be served from any available data replica to provide lower latency access for a subset of users or to offload computation from the primary location of the tenant's data.

According to various embodiments, techniques and mechanisms described herein provide for a unified solution for disaster recovery, instance refreshing, and tenant data migration through the continuous copy and synchronization of tenants' data. A tiered tenant placement procedure allows for the creation and configuration of, for example, local, regional, and global replicas on a per-tenant basis. Hierarchical replication may be used to continuously synchronize replicas. This architecture may allow for relocating tenants at a significantly higher scale and frequency in comparison to conventional techniques. In turn, such techniques may reduce costs and/or provide for new capabilities such as allowing tenants to manage failovers to high availability replicas in a self-service manner.

According to various embodiments, tenant data may be transferred between different locations for any of a variety of reasons. For instance, to another to address a hardware, software, or network failure at the source location. When such an event is detected, the system may automatically transfer access to tenant data to a different location. Alternately, or additionally, an administrator may manually specify a location to which to transfer the data access.

In some embodiments tenant data may be transferred to provide improved performance. For example, congestion may cause a particular portion of a hierarchical distributed database to become slower than desirable. For example, a globally active tenant seeking low latency access may transfer access between replicas to position the active replica in a location geographically proximate to connection requests based on time of day. As another example, a system upgrade may create a need to transfer a tenant from one location to another within the hierarchical database.

According to various embodiments techniques and mechanisms described herein may be applied to various databases configured in accordance with a range of different database architectures. For purposes of illustration, some techniques and mechanisms are described herein with reference to multitenant databases configured to store data associated with multiple database tenants in a single table. However, other configurations are possible. For example, different organizations may be associated with different database tables within the same database system. As another example, different organizations may be associated with different databases within the same overarching on-demand database system. As still another example, a single organization may be associated with different data portions. Thus, the techniques and mechanisms described herein may be employed to replicate units or portions of data in various configurations of hierarchical distributed database systems.

Consider the example of Alexandra, a systems administrator responsible for maintaining a database associated with a client, Acme Co., within a distributed database system accessed via an on-demand computing services environment. Alexandra needs to maximize the uptime of the database service for Acme's to avoid disruptions to its business. She also needs to be able to change the location of Acme's data within the distributed database system for instance to transition to a data center that provides reduced latency.

Under a traditional approach, Alexandra would face difficulty in addressing these challenges. Transitioning Acme's data from one data center to another would require potentially hours of downtime, during which the data would be unavailable. Access to the data would first be disabled at the original location. The data would then be copied to the new location. After the copy operation was completed, access to the data at the new location would be enabled.

When using techniques and mechanisms described herein, the transfer of the data would be more streamlined. One or more replicas of Acme's data would be kept up-to-date at locations within the database determined based on Alexandra's configuration choices. Switching from one location to another could then be done seamlessly, without disabling access to Acme's data.

FIG. 1 illustrates an example of an overview method 100 for tenant data transfer, performed in accordance with one or more embodiments. According to various embodiments, the method 100 may be performed at one or more computing devices within an on-demand computing services environment. Examples of such devices and environments are discussed throughout the application, such as with respect to FIGS. 5 and 8-10.

One or more tenant data replica locations are identified via tiered consistent hashing at 102. According to various embodiments, tenant data may be located within a tiered, distributed database system. The tenant data may be predominantly located at a designated, or "home" location within the system. One or more replicas of the data may be created for redundancy, failover, load balancing, or other such uses.

In some implementations, a location for such a replica may be identified for any of various reasons. For example, a location may be identified when an administrator associated with the tenant requests to create a new replica. As another example, a location may be identified when the system automatically creates a new replica.

In particular embodiments, a location for a tenant data replica may be identified at least in part via tiered consistent hashing. Alternately, or additionally, other tenant data replica location identification techniques may be used. Additional details regarding the identification of a tenant data replica are discussed with respect to the method 200 shown in FIG. 2.

Tenant data is replicated to the identified locations via database synchronization at 104. According to various embodiments, database synchronization may be performed via a hierarchical change bus that replicates changes to the tenant data continuously and dynamically as those changes are made to the primary data source. In this way, the one or more replicas may be kept up-to-date, enabling rapid transition of operations from one location to another. Additional details regarding the replication of tenant data within a hierarchical distributed database are discussed with respect to the FIGS. 2, 3, 4, and 5.

Tenant access to a designated replica is transferred upon request at 106. According to various embodiments, such a request may be associated with any of various conditions. For example, such a request may be generated automatically in the event that the original location associated with the tenant data is associated with a software, networking, or hardware failure. As another example, such a request may be generated based on user input, for instance when a systems administrator asks to initiate such a transfer. As yet another example, such a request may be generated as part of a procedure for shutting down a database module, for instance to replace outdated hardware. Additional details regarding the transfer of tenant access to data are discussed with respect to the method 700 shown in FIG. 7.

Figure 2:
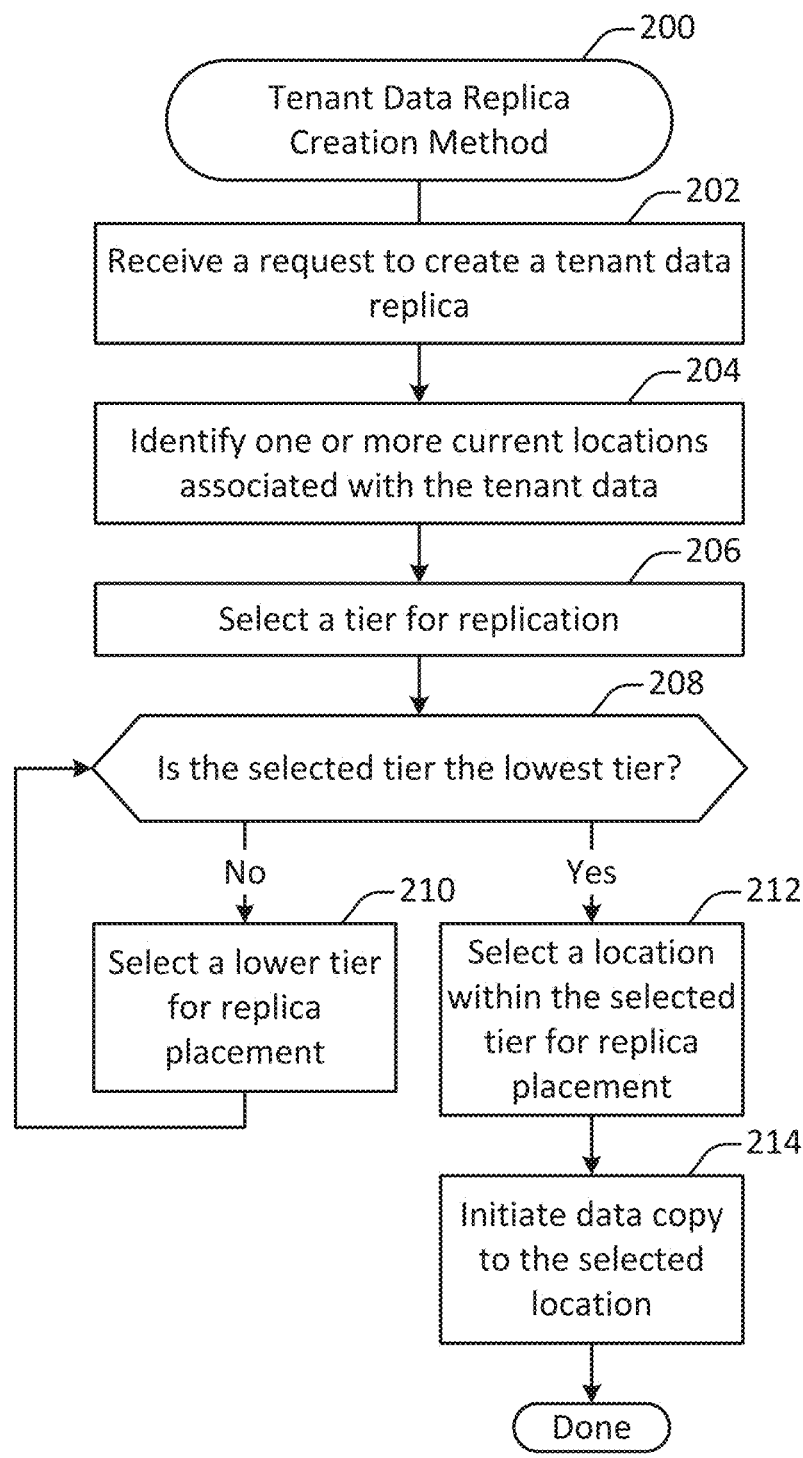
FIG. 2 illustrates a method for creating a tenant data replica, performed in accordance with one or more embodiments.

FIG. 2 illustrates a method 200 for creating a tenant data replica, performed in accordance with one or more embodiments. According to various embodiments, the method 200 may be performed at one or more computing devices within an on-demand computing services environment. For example, the method 200 may be performed at one or more devices shown in the architecture diagram presented in FIG. 5.

A request to create a tenant data replica is received at 202. In some implementations, the request may be generated based on user input. For instance, a user may request to create a replica to increase storage redundancy, improve access times, or for another such reason. Alternately, the request may be generated automatically. For instance, the system may determine that an existing replica is located on a pod that is designated for being decommissioned, for example to update the hardware.

At 204, one or more current locations associated with the tenant data are identified. According to various embodiments, the one or more current locations may include a primary location for the tenant data. In some instances, the current locations may include one or more replicas of the tenant data stored at the primary location.

In some embodiments, the current locations associated with the tenant data may be identified by analyzing configuration information. Such information may be stored at any suitable location, such as, but not limited to, one or more of the replication policy nodes shown in FIG. 5.

A tier for replication is selected at 206. According to various embodiments, the tier for replication may be used to specify the logical distance in the hierarchy between the primary tenant data and the replica. For example, a local replica may be created within the same data center as the primary tenant data. As another example, a regional replica may be created at a different data center within the same geographic region as the primary tenant data. As yet another example, a global replica may be created at a data center within a different geographic region as the primary tenant data. As discussed herein, hierarchical database systems may exhibit different configurations and numbers of tiers.

In some implementations, the tier for replication may be determined at least in part based on user input. For instance, an administrator may specify a tier at which to replicate data. Alternately, the tier for replication may be determined at least in part automatically. For example, if a tenant already has exhausted possible locations for replicas within a designated level of the hierarchy, then a replica may be created at a higher level. As another example, when a replica is created automatically, for instance when an existing pod is being decommissioned, a new replica may be automatically created at the same level in the hierarchy.

A determination is made at 208 as to whether the selected tier is the lowest tier in the hierarchy. For instance, in the global/regional/local example of a hierarchy discussed herein, the determination made at 208 would evaluate whether the selected tier was the local level. If not, then at 210 a lower tier is selected for replica placement. If so, then at 212 a location within the selected tier is selected for replica placement.

According to various embodiments, lower tiers and locations within a selected tier may be selected via hierarchical consistent hashing. Hierarchical consistent hashing provides a way to distribute primary tenant data and replicas of that data across the distributed hierarchical database. The hashing approach is consistent in the sense that the locations and tiers are selected in a deterministic way, for instance based on an identifier that is unique to the tenant. The hashing approach is hierarchical in the sense that each non-terminal node within the hierarchy may be associated with its own hash ring. Additional details regarding selection based on hierarchical consistent hashing are discussed throughout the application, and in particular with respect to FIGS. 3 and 4.

At 214, data copy to the selected location is initiated. According to various embodiments, data may be copied to the selected location from the primary tenant data source, from one or more replicas of that source, or from a combination thereof. Once the majority of the tenant data is copied, successive changes to the primary data may be replicated to the new replica. Techniques for replicating changes to the primary data to one or more replicas are discussed throughout the application, and in particular with respect to the method 600 shown in FIG. 6.

Figure 3:
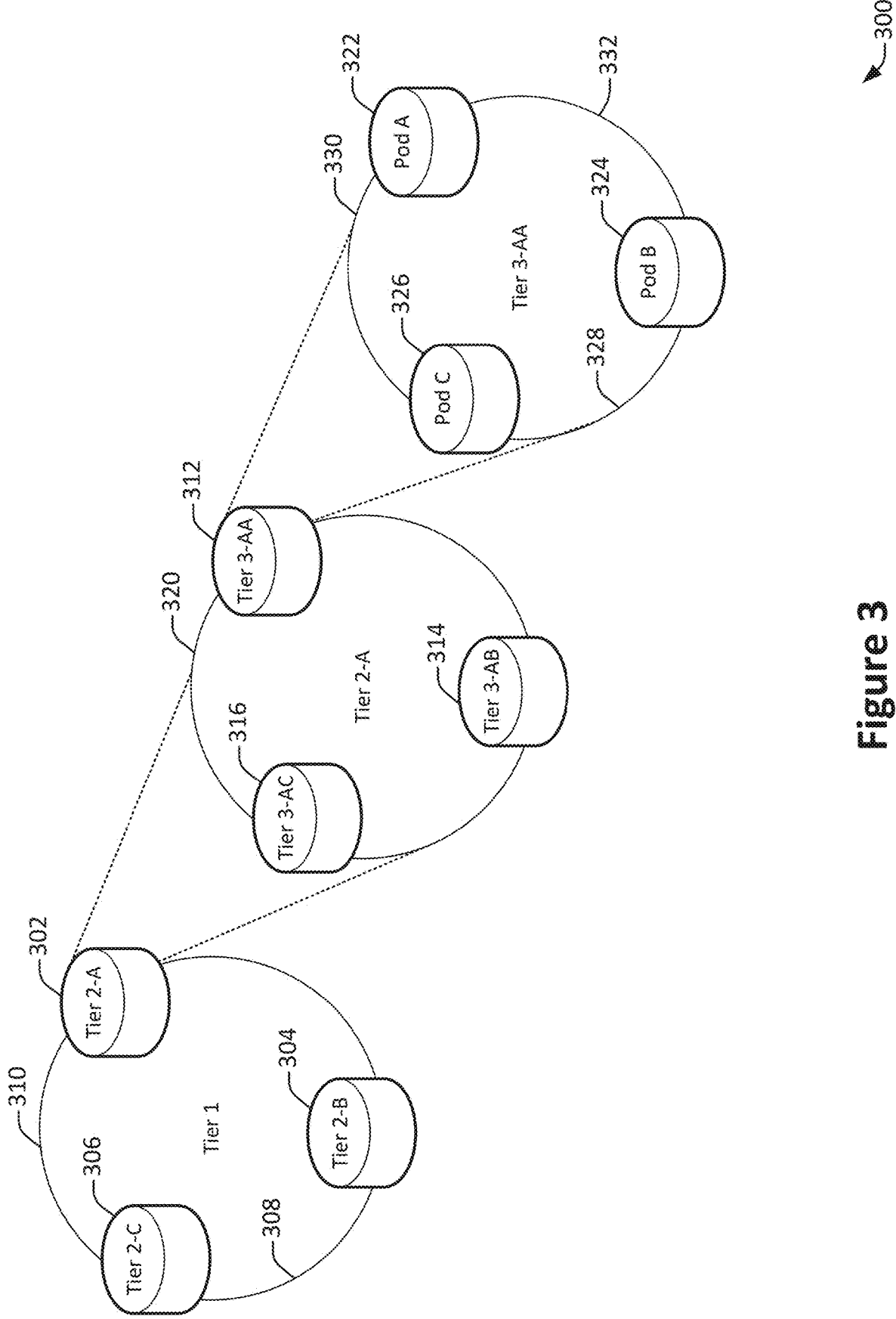
FIG. 3 illustrates an arrangement of components in a hierarchical distributed database located along consistent hashing rings, configured in accordance with one or more embodiments.

FIG. 3 illustrates an arrangement of components 300 in a hierarchical distributed database located along consistent hashing rings, configured in accordance with one or more embodiments. The arrangement of components 300 represents a logical diagram illustrating techniques discussed with respect throughout the application, and in particular with respect to the method 200 shown in FIG. 2.

The hierarchical distributed database shown in FIG. 3 includes a hierarchy with three levels. Tier 1 constitutes the top level of the hierarchy, and is composed of tier 2-A 302, tier 2-B 304, and tier 2-C 306. Tier 1 may be referred to herein as a global level.

Tier 2 constitutes the middle level of the hierarchy. Each of tier 2-A 302, tier 2-B 304, and tier 2-C 306 may include one or more lower levels. However, to simplify exposition only one portion of tier 2, corresponding to tier 2-A 302, is shown in FIG. 3. Tier 2-A 302 includes tier 3-AA 312, tier 3-AB 314, and tier 3-AC 316. Tier 2 may be referred to herein as a regional level.

Tier 3 constitutes the lowest level of the hierarchy. Each of tier 3-AA 312, tier 3-AB 314, and tier 3-AC 316 may include one or more lower levels. However, to simplify exposition only one portion of tier 3, corresponding to tier 3-AA 312, is shown in FIG. 3. Tier 3-AA 312 includes pods A 322, B 3 324, and C 326. Tier 3 may be referred to herein as a data center level.

According to various embodiments, each database pod represents a logical end point within the hierarchical distributed database at which tenant data may be stored. For example, a data center may be divided into different pods, which comprise distinct hardware and/or software instances for providing database services.

According to various embodiments, each tier within the hierarchical distributed database represents a logical arrangement of components at lower levels of the hierarchy. It should be noted that various configurations are possible. For example, FIG. 3 shows an arrangement with three tiers in the hierarchy, where each tier has three branches. However, in practice a hierarchical distributed database may have various numbers of tiers, each of which may have various numbers of branches. Further, the hierarchy need not necessarily be balanced. For example, one branch of a hierarchical distributed database tier may have two sub-tiers, while a different branch may have three sub-tiers.

FIG. 3 illustrates a logical arrangement of database components located along consistent hashing rings for the purposes of hierarchical consistent hashing. In some implementations, each tier may be treated as a hash ring. For instance, consider the tier 3-AA 312. Suppose that a tenant's primary data store is located in the pod A 322. Now suppose that a request is received to create a local replica of the tenant data at the level of the data center. To determine where to locate the replica, a unique identifier associated with the tenant may be hashed to produce a value located in a logical space represented by the ring associated with the tier 3-AA 312. The system may then proceed in a clockwise direction around the ring to identify the next pod as the location for the replica. For example, if the hashed value were located in the ring portion 330, then the pod A 322 may be chosen for the replica. If instead the hashed value were located in the ring portion 332, then the pod B 324 may be chosen for the replica. If instead the hashed value were located in the ring portion 328, then the pod C 326 may be chosen for the replica.

In some implementations, a pod may be skipped if the pod already contains either a replica or the primary tenant data. For example, if the primary tenant data is included in the pod A 322 and the tenant identifier hashes to a value in the region 330 of the hash ring, then the system may skip the pod A 322 and instead place the replica in the next available pod along the hash ring (i.e., the pod B 324).

According to various embodiments, each location within a tier of the hierarchy may be associated with a respective consistent hash ring, which may be used to locate replicas within that level of the hierarchy. For example, consider a situation in which tenant data is stored within a pod located within the tier 3-AB 314. Now suppose an instruction is received to create a replica of the tenant data at the regional level. To determine where to locate the regional replica, a unique identifier associated with the tenant may be hashed to a value along the hash ring associated with the tier 2-A 302. Suppose also that the unique identifier is hashed to a value along the hash ring region 320. The system would then proceed clockwise to the first available lower tier of the hierarchy, in this case the tier 3-AA 312. The system would then locate the hashed unique identifier along the hash ring associated with the lower tier, the tier 3-AA 312. Suppose also that in the lower tier 3-AA 312, the tenant's identifier hashes to a value along the hash ring portion 328. In this case, the system would proceed clockwise around the hash ring, and the tenant replica would be located in the pod C 326.

According to various embodiments, the diagram shown in FIG. 3 thus provides a logical way to determine locations for replicas at any level of the hierarchy for any tenant. As discussed with respect to the method 200 shown in FIG. 2, the system first determines the level at which to identify the replica. The system then iteratively employs the hierarchical consistent hash ring approach to determine a terminal location of the hierarchical distributed database at which to locate the data.

For example, to determine a location for a global replica of tenant data stored on a pod within the tier-2-C 306, the system would hash a unique identifier associated with the tenant to a value along the tier 1 hash ring. Suppose that the identifier hashes to a value associated with the ring region 308. The system would then proceed along the ring clockwise, skipping tier 2-C 306 because the tenant's data is already located in that region. The system would then proceed through the hash ring portion 310 to the tier 2-A 302. The system would then iteratively proceed down through lower levels of the hierarchy starting with the tier 2-A 302, determining a successive level at each step via the hierarchical consistent hashing techniques described herein.

According to various embodiments the hierarchical consistent hashing scheme may be implemented in any suitable way while remaining consistent with the concepts described herein. For example, the system may proceed in a counter-clockwise direction rather than a clockwise direction. As another example, any suitable hash function may be used, as long as the same hash function is used each time. In this way, the same identifier will always hash to the same pod.

Figure 4:
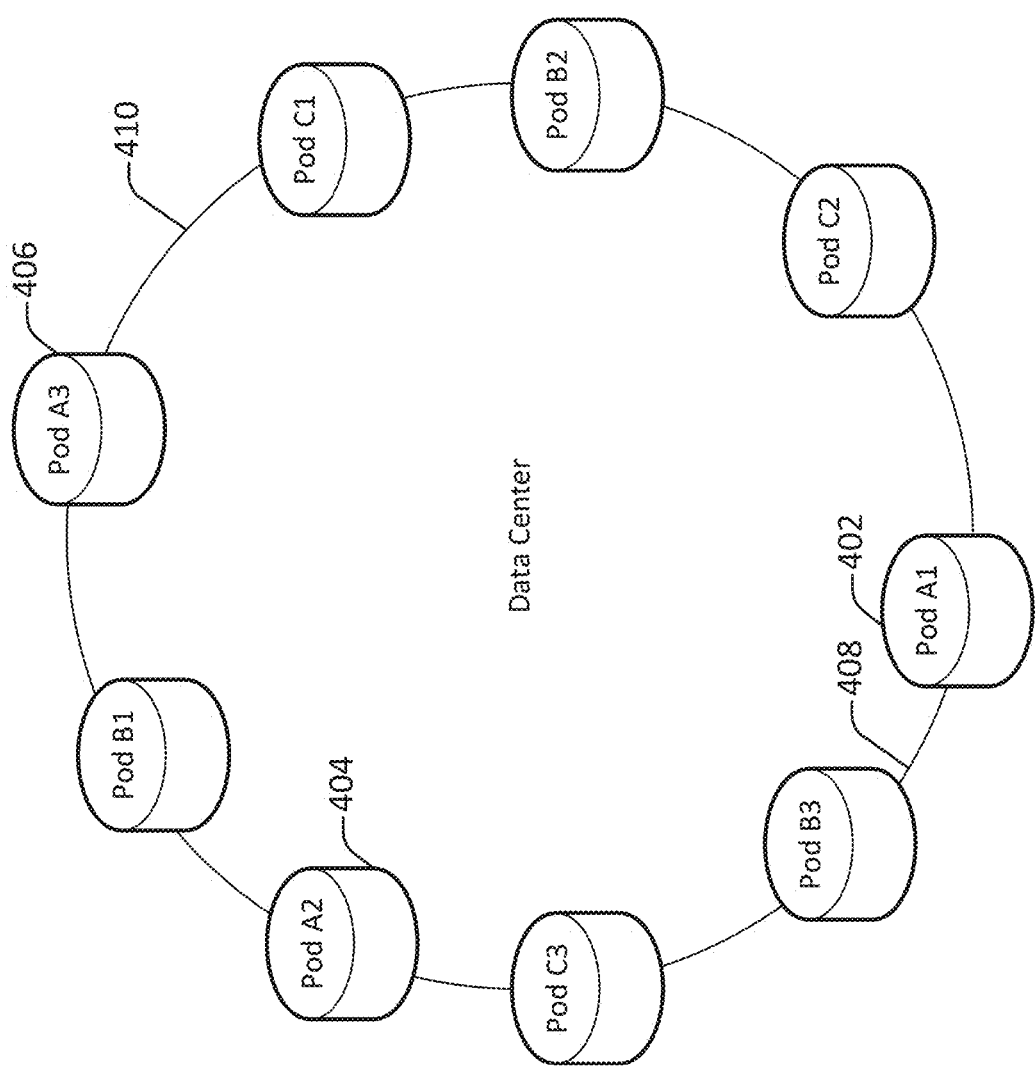
FIG. 4 illustrates an architecture diagram of pods within a data center along a consistent hash ring, configured in accordance with one or more embodiments.

FIG. 4 illustrates an architecture diagram 400 of pods within a data center along a consistent hash ring, configured in accordance with one or more embodiments. For the purpose of illustration, the data center includes three pods: A, B, and C. However, in FIG. 4 each of these pods is located at three logical positions around the hash ring. For example, the pod A is logically located at three places: pod A1 402, pod A2 404, and pod A3 406. In this way, the system may configure the hash function to reduce bunching and to smooth the distribution of replicas and tenants across the pods.

According to various embodiments, pods need not be located at symmetrical positions along a consistent hash ring. For example, in FIG. 4, the ring portion 408 is smaller than the ring portion 410 reducing the likelihood of an identifier hashing to pod B relative to pod C.

In some implementations, the system may adjust the position of pods along the hash ring to alter the distribution of replicas and/or tenants. For example, if pod C includes a tenant with a substantial amount of data, the system may relocate the pods along the hash ring so that other tenants are less likely to hash to a value that maps to pod C.

According to various embodiments, the type of variation shown in the logical arrangement of pods along the hash ring included in FIG. 4 may be exhibited at any suitable level of the hierarchy. Thus although such variation is shown in FIG. 4 at the level of pods and data centers, the system may also implement such an approach at the level of data centers within regions, and/or at the level of regions within the global tier.

Figure 5:
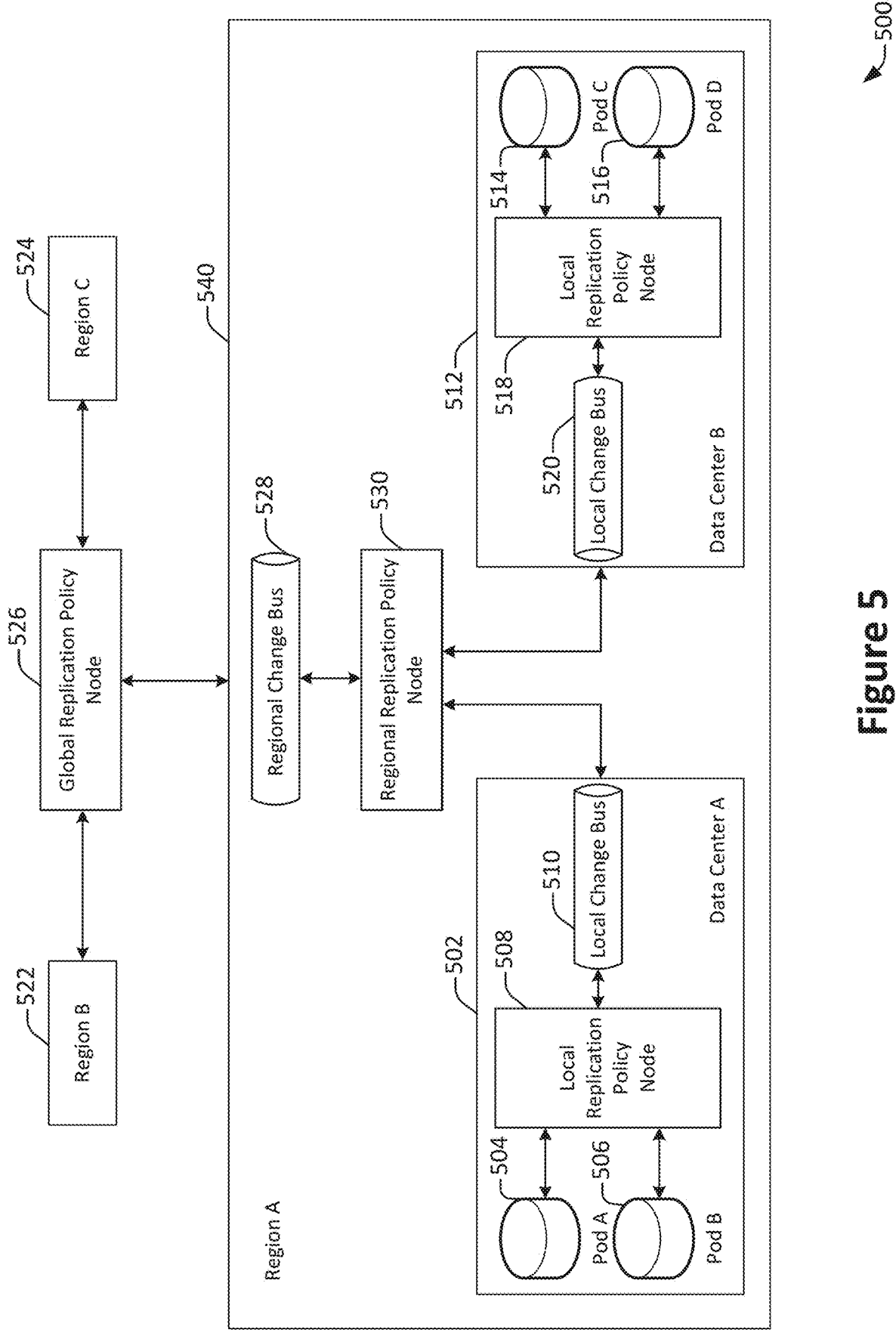
FIG. 5 illustrates a system architecture configured for performing one or more techniques described herein, provided in accordance with one or more embodiments

FIG. 5 illustrates a system architecture 500 configured for performing one or more techniques described herein, provided in accordance with one or more embodiments. The system architecture 500 includes components configured to provide a hierarchical distributed database. The hierarchical distributed database includes region A 540, region B 522, and region C 524 in communication via a global replication policy node 526.

According to various embodiments each region includes a respective regional change bus and regional replication policy node. For example the region A 540 includes the regional change bus 528 and the regional replication policy node 530. Each region also includes one or more data centers. For example, the region A 540 includes the data center A 502 and the data center B 512.

According to various embodiments, each data center includes a respective local change bus and a respective local replication policy node. For example, the data center A 502 includes the local replication policy node 508 and the local change bus 510, while the data center B 512 includes the local change bus 520 and the local replication policy node 518.

According to various embodiments, each data center also includes a respective one or more pods. the data center A 502 includes the pod A 504 and the pod B 506, while the data center B 512 includes the pod C 514 and the pod D 516.

In some implementations, a database pod may be composed of various types of hardware and software elements configured to provide database services. Each database pod constitutes a logical location for active tenant data or for a replica of active tenant data. A database pod may include data for any suitable number of tenants.

In some embodiments, a database pod may be configured to respond to database access requests. For example, a database pod may be configured to execute a request to update data stored in a database table within the pod. As another example, a database pod may be configured to execute a request to retrieve data from a database table within the pod.

Changes to a database table may be captured via a change bus. In some implementations, a change bus may capture changes (e.g., row-level changes) that have been made to the primary database. In some configurations, one or more commercially available row-level change capture solutions may be employed, such as the GoldenGate and/or the Log Miner systems available from Oracle Corporation of Redwood Shores, Calif.

In some embodiments, A change bus may output change stream, which may identify, in a granular fashion, individual changes to database rows in database tables in the primary database 202. For example, an entry in a change stream may indicate that one or more values in a particular row in a database table were updated. As another example, another entry may indicate that a column in a database table was added or removed. As still another example, yet another entry may indicate that a database row was added or removed.

In some implementations, each change bus may aggregate changes made to databases at lower levels of the hierarchy. For example, the local change bus 510 may aggregate changes made to the pod A 504 and the pod B 506, while the regional change bus 528 may aggregate changes made to the pods A 504, B 506, C 514, and D 516.

According to various embodiments, a change bus may aggregate changes made to tenant data that is configured for replication at a higher level of the hierarchical distributed database. Whether tenant data is so configured is an issue that may be determined by a replication policy node. For example, the local replication policy node 508 may be used to filter changes made to the pods A 504 and B 506. If a change is made to tenant data that is not replicated outside of the data center A 502, then that change may not be output to the local change bus 510. If instead a change is made to tenant data that is replicated elsewhere, such as to the pod C 514, then the change may be published to the local change bus 510.

In some implementations, each replication policy node may be used to filter database changes at the respective level of the hierarchy. For example, the local replication policy node 508 may be used to filter changes made to data within the data center A 502. As another example, the regional replication policy node 530 may be used to filter changes made to data within data centers in the region A 540 that are replicated to a replica above the level of the data center where the primary data is stored. As yet another example, the global replication policy node 526 may be used to filter changes made to data within any data centers that are replicated to a replica above the level of the region where the primary data is stored. Additional details regarding the replication of tenant data are discussed with respect to the method 600 shown in FIG. 6.

According to various embodiments, a hierarchical distributed database system may employ one or more push operations to replicate changes from a source node to a target node across the hierarchy. For example, changes may be pushed to a local change bus from a pod if the pod includes a data source configured with a local replica. As another example, changes may be pushed to a regional change bus from a local change bus if a pod includes a data source configured with a regional replica.

According to various embodiments, a hierarchical distributed database system may employ one or more pull operations to replicate changes from a source node to a target node across the hierarchy. For example, changes may be pulled by a global replication node from a first regional change bus to a second regional change bus if the first regional change bus encompasses a pod in which at least one tenant is configured with a global replica. As another example, changes may be pulled from a regional change bus to a local change bus if the regional change bus includes a pod in which at least one tenant is configured with a regional replica encompassed by the local change bus.

According to various embodiments, pull and/or push operations may be managed by replication policy nodes. For example, a global replication policy node may manage operations between regions. As another example, a regional replication policy node may manage operations between data centers. As still another example, a local replication policy node may manage operations between pods within a data center.

It should be noted that the architecture diagram presented in FIG. 5 is included as an example for the purpose of illustration, and that systems may have numbers and arrangements of components different than that shown in FIG. 5. For example, in FIG. 5, each of the two data centers include two database pods. However, in practice a data center may include any suitable number of pods. Similarly, a hierarchical distributed database may include any suitable number of data centers, regions. As another example, the hierarchical distributed database shown in FIG. 5 includes three levels within the hierarchy (i.e., global, regional, and local). However, in practice a hierarchical distributed database may include any suitable number of levels.

According to various embodiments, pairs of pods may be described in terms of their relative location within the hierarchy. Their relative location within the hierarchy may be specified in terms of the minimum level from the bottom that must be traversed in order to communicate between them. For example, pods C 514 and D 516 are located locally to one another within the data center level. As another example pods C 514 and A 504 are located remotely to one another within the data center level but locally to one another within the regional level because they share the same region. However, a pod located in region B 522 would be considered to be located remotely from the pod A 504 at the region level because the two pods would be located in different regions.

Figure 6:
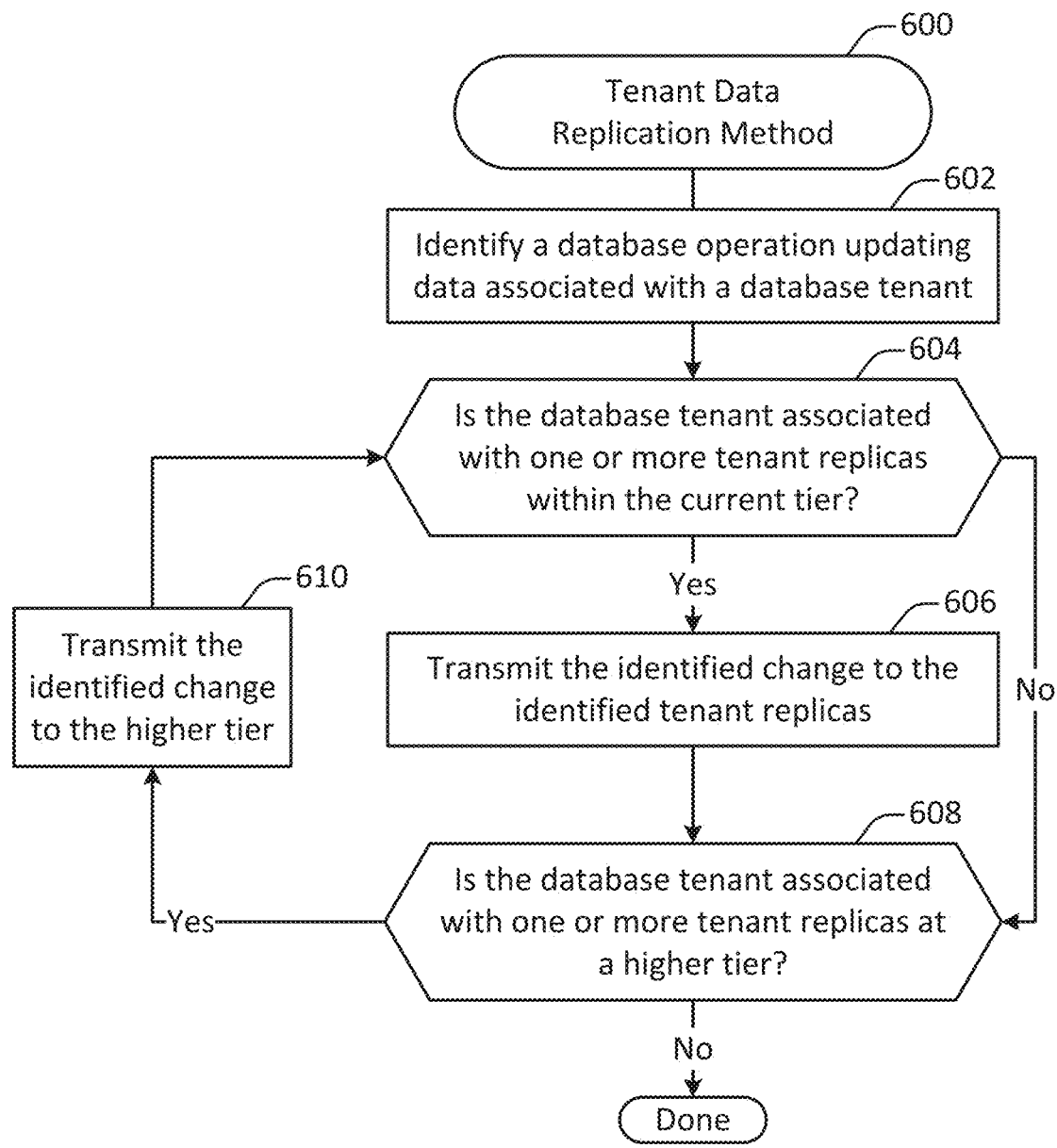
FIG. 6 illustrates a method for replicating tenant data, performed in accordance with one or more embodiments.

FIG. 6 illustrates a method 600 for replicating tenant data, performed in accordance with one or more embodiments. In some implementations, the method 600 may be performed at one or more computing devices within an on-demand computing services environment. For example, the method 600 may be performed at one or more devices discussed with respect to FIG. 5.

At 602, a database operation updating data associated with a database tenant is identified. According to various embodiments, the database operation may be triggered in any of a variety of ways. For example, a database update request received via an API may be executed. As another example, a database script may be executed to update one or more database tables. As yet another example, a native application within an on-demand computing services environment may update a database table.

In some implementations, the database operation may be identified by a change bus. For example, as discussed with respect to FIG. 5, a local change bus such as the change bus 510 may capture changes to data stored in pods within a data center.

A determination is made at 604 as to whether the database tenant is associated with one or more tenant replicas within the current tier. According to various embodiments, the determination may be made in part based on configuration data accessible to the change bus. For example, the configuration data may be accessible via a local, regional, or global replication policy node.

In some implementations a database tenant is associated with one or more tenant replicas within the current tier if a tenant replica to which the data changed at 602 has not yet been copied is reachable by proceeding to a lower level of the hierarchy. For example, if a tenant's data is located at Pod A 504 in FIG. 5, and the tenant is associated with a replica in Pod B 506, then at the local change bus 510 a determination would be made that the database tenant is associated with one or more tenant replicas within the current tier. However, if instead the replica were located at Pod C 514 and not at Pod B 506, then the determination would be made at 510 that the database tenant was not associated with one or more tenant replicas within the current tier.

When it is determined that the database tenant is associated with one or more tenant replicas within the current tier, then at 606 the identified change is transmitted to the identified one or more tenant replicas. According to various embodiments, the change may be transmitted by sending a database update request to the one or more tenant replicas via the database hierarchy. The change may then be implemented by the recipient replica, updating the recipient replica so that the data stored thereon matches the data stored in the tenant's primary storage location.

According to various embodiments, the change may be associated with an identifier unique to the tenant, referred to as a tenant change clock identifier. In this way, the system may rapidly determine which changes have been implemented in a replica, and may implement those changes in a temporally consistent manner across the hierarchical distributed database.

A determination is made at 608 as to whether the database tenant is associated with one or more tenant replicas at a higher tier. According to various embodiments, the determination may be made at least in part based on configuration information, such as configuration information stored in a replication policy node.

In some implementations, the determination made at 608 may be made at least in part by evaluating whether the tenant is associated with any replicas that may only be reached by traversing a higher level of the hierarchical distributed database. For example, suppose that the active and primary storage location for the tenant's data is in Pod A 504 shown in FIG. 5, and that the tenant's data is associated with a replica in Pod C 514. In this example, the replica would be reachable from the local change bus 510 via a higher level in the database hierarchy, such as through the regional replication policy node 530. If the tenant's data were also associated with another replica in region C 524, then that example, the replica would be reachable from the regional change bus 528 via a higher level in the database hierarchy, such as through the global replication policy node 526.

When it is determined that the database tenant is associated with one or more tenant replicas at a higher level, the identified change is transmitted to the higher tier. For example, in FIG. 5, the change may be transmitted from the local change bus 510 to the regional change bus 528 via the regional replication policy node 530. On a successive iteration the change may then be transmitted to the change bus of the remote region via the global replication policy node 526. On a successive iteration, the change may then be transmitted to the global replication policy node 526.

Figure 7:
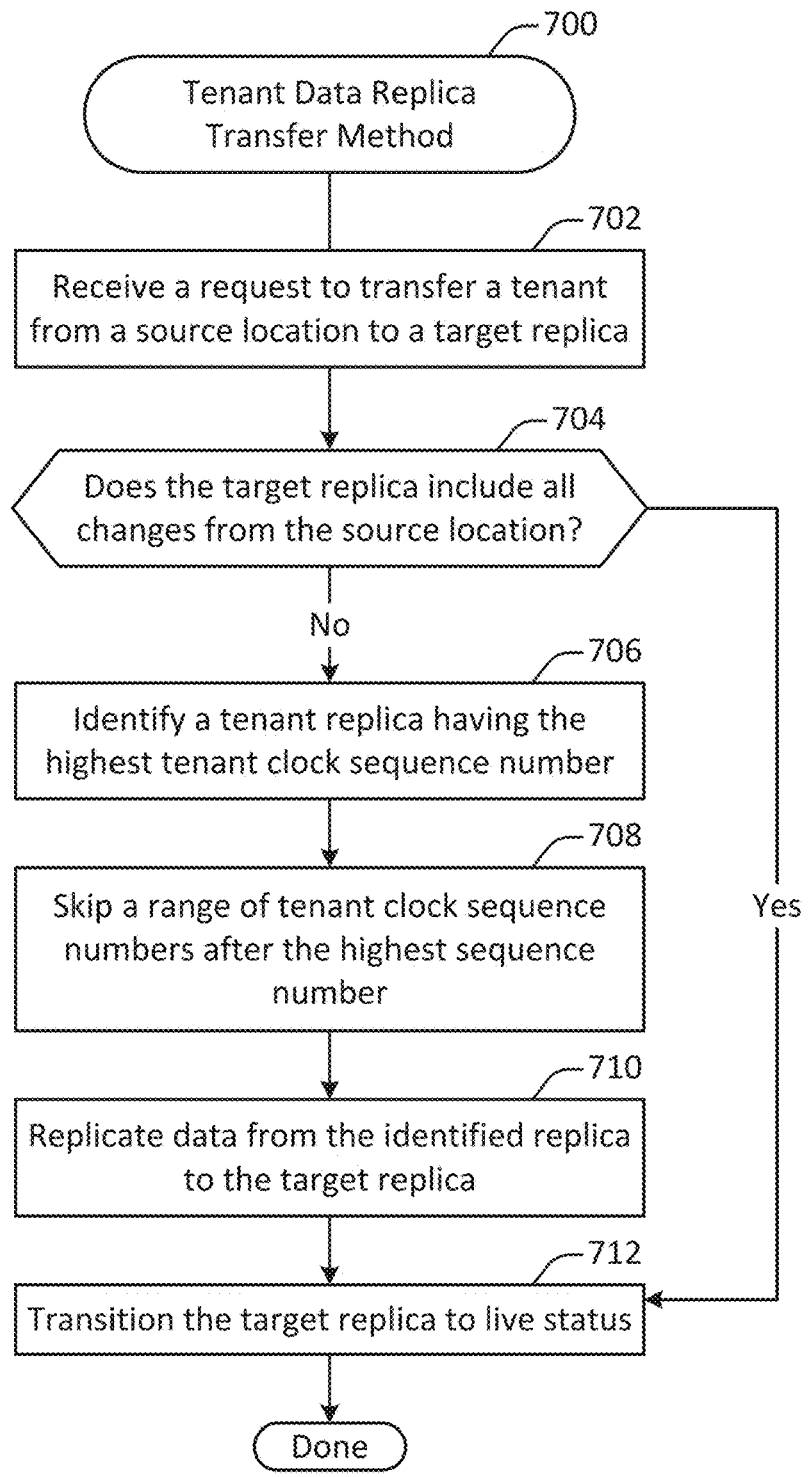
FIG. 7 illustrates a method for transferring tenant data access between replicas, performed in accordance with one or more embodiments.

FIG. 7 illustrates a method 700 for transferring tenant data access between replicas, performed in accordance with one or more embodiments. The method 700 may be performed at one or more computing devices within an on-demand computing services environment. For example, the method 700 may be performed at one or more components discussed with respect to the system 500 shown in FIG. 5.

A request to transfer a tenant from a source location to a target replica is received at 702. In some implementations, the request may be generated based on user input, such as a request generated by an administrator. Alternately, the request may be generated automatically. For example, the system may determine that access to a tenant's data needs to be transferred from one location to another, for instance based on a detected hardware, software, or network failure event.

A determination is made at 704 as to whether the target replica includes all changes from the source location. According to various embodiments, the determination may be made in part based on a tenant-specific data change clock, referred to herein as a tenant clock. Each change made to the live tenant data may be associated with an identifier specific to the tenant and the change. With each successive change, the identifier may be incremented. In this way, the state of a replica may be compared with the state of other replicas and/or the live version of the tenant data. If the latest change to the replica is associated with a tenant clock value that is identical to the highest tenant clock value in the live version of the tenant data, then the replica includes all changes from the source location. Otherwise, the replica is out of date.

When it is determined that the target replica does not include all changes from the source location, then at 706 a tenant replica having the highest tenant clock sequence is identified. According to various embodiments, each tenant replica may maintain a value that identifies the highest tenant clock sequence identifier for any change that has been replicated to the replica.

At 708, a range of tenant clock sequence numbers after the highest sequence number is skipped. According to various embodiments, a range of sequence numbers may be skipped to avoid collisions between changes that have been lost and successive changes. The specific number of sequence numbers to skip may be strategically determined based on any of a variety of factors, such as the typical number of changes that are received within a designated period of time.

Data is replicated from the identified replica to the target replica at 710. According to various embodiments, the data may be replicated by identifying any changes having a sequence number higher than the highest number associated with the target replica. Those changes may then be copied from the identified replica to the target replica.

At 712, the target replica is transitioned to live status, which may also be referred to as an active state. In some implementations, the target replica may be transitioned to live status by updating routing information for incoming data access requests to direct them to the target replica. In some implementations, the data source may be transitioned to an inactive state for the designated tenant. When in the inactive state, the source pod may be treated similarly to any other replica within the system.

Figure 8:
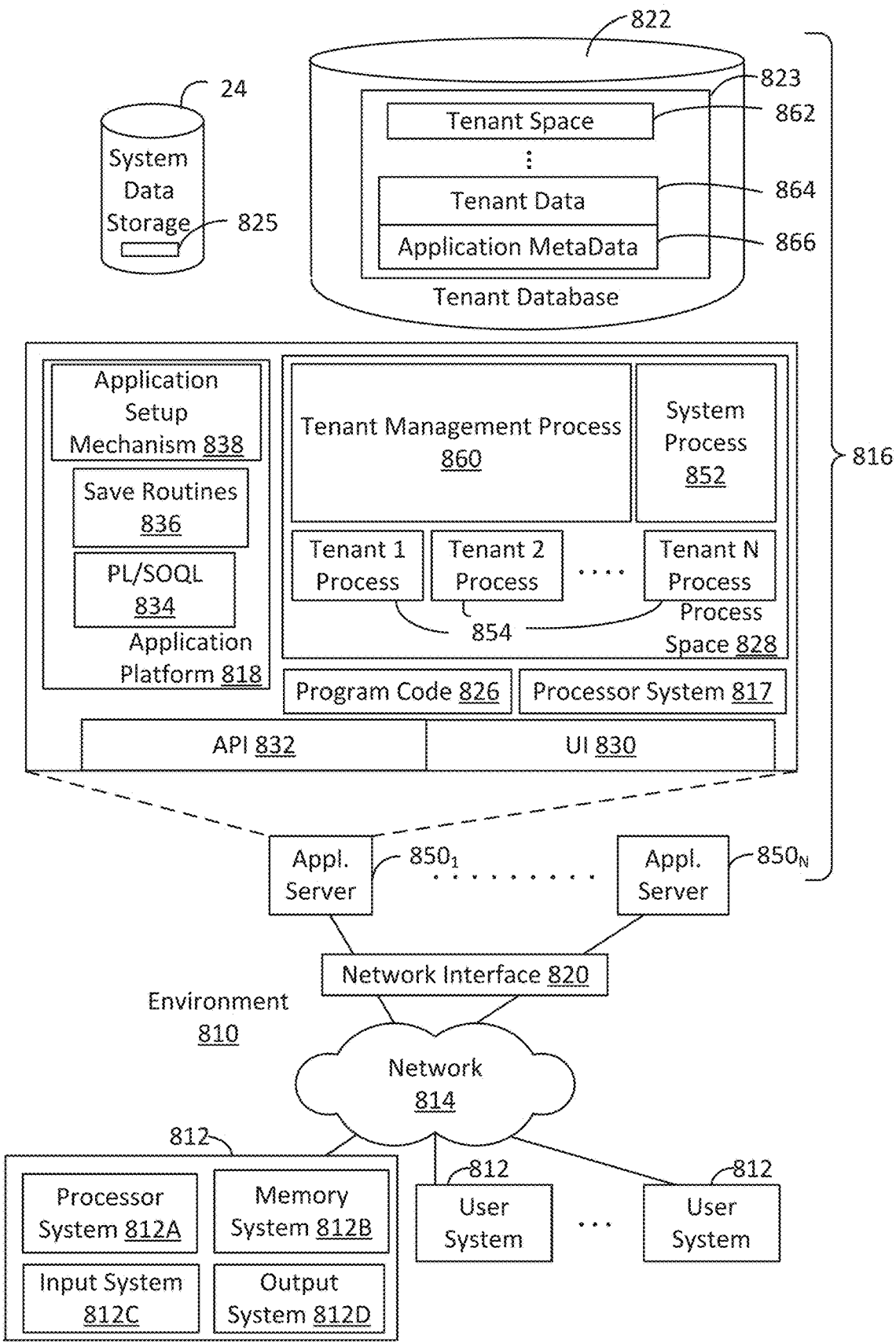
FIG. 8 shows a block diagram of an example of an environment that includes an on-demand database service configured in accordance with some implementations.

FIG. 8 shows a block diagram of an example of an environment 810 that includes an on-demand database service configured in accordance with some implementations. Environment 810 may include user systems 812, network 814, database system 816, processor system 817, application platform 818, network interface 820, tenant data storage 822, tenant data 823, system data storage 824, system data 825, program code 826, process space 828, User Interface (UI) 830, Application Program Interface (API) 832, PL/SOQL 834, save routines 836, application setup mechanism 838, application servers 850-1 through 850-N, system process space 852, tenant process spaces 854, tenant management process space 860, tenant storage space 862, user storage 864, and application metadata 866. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 816, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 816. Such applications may be developed by the database service provider or by users or third-party application developers accessing the service. Application platform 818 includes an application setup mechanism 838 that supports application developers' creation and management of applications, which may be saved as metadata into tenant data storage 822 by save routines 836 for execution by subscribers as one or more tenant process spaces 854 managed by tenant management process 860 for example. Invocations to such applications may be coded using PL/SOQL 834 that provides a programming language style interface extension to API 832. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 866 for a subscriber making such an invocation. Such system processes may also manage execution of application metadata 866 as an application in a virtual machine.

In some implementations, each application server 850 may handle requests for any user associated with any organization. A load balancing function (e.g., an F5 Big-IP load balancer) may distribute requests to the application servers 850 based on an algorithm such as least-connections, round robin, observed response time, etc. Each application server 850 may be configured to communicate with tenant data storage 822 and the tenant data 823 therein, and system data storage 824 and the system data 825 therein to serve requests of user systems 812. The tenant data 823 may be divided into individual tenant storage spaces 862, which can be either a physical arrangement and/or a logical arrangement of data. Within each tenant storage space 862, user storage 864 and application metadata 866 may be similarly allocated for each user. For example, a copy of a user's most recently used (MRU) items might be stored to user storage 864. Similarly, a copy of MRU items for an entire tenant organization may be stored to tenant storage space 862. A UI 830 provides a user interface and an API 832 provides an application programming interface to system 816 resident processes to users and/or developers at user systems 812.

System 816 may implement a web-based CRM system. For example, in some implementations, system 816 may include application servers configured to implement and execute CRM software applications. The application servers may be configured to provide related data, code forms web pages and other information to and from user systems 812. Additionally, the application servers may be configured to store information to, and retrieve information from a database system. Such information may include related data, objects, and/or Webpage content. With a multi-tenant system, data for multiple tenants may be stored in the same physical database object in tenant data storage 822, however, tenant data may be arranged in the storage medium(s) of tenant data storage 822 so that data of one tenant is kept logically separate from that of other tenants. In such a scheme, one tenant may not access another tenant's data unless such data is expressly shared.

Several elements in the system shown in FIG. 8 include conventional, well-known elements that are explained only briefly here. For example, user system 812 may include processor system 812A, memory system 812B, input system 812C, and output system 812D. A user system 812 may be implemented as any computing device(s) or other data processing apparatus such as a mobile phone, laptop computer, tablet, desktop computer, or network of computing devices. User system 12 may run an internet browser allowing a user (e.g., a subscriber of an MIS) of user system 812 to access, process and view information, pages and applications available from system 816 over network 814. Network 814 may be any network or combination of networks of devices that communicate with one another, such as any one or any combination of a LAN (local area network), WAN (wide area network), wireless network, or other appropriate configuration.

The users of user systems 812 may differ in their respective capacities, and the capacity of a particular user system 812 to access information may be determined at least in part by "permissions" of the particular user system 812. As discussed herein, permissions generally govern access to computing resources such as data objects, components, and other entities of a computing system, such as a hierarchical distributed database system, a social networking system, and/or a CRM database system. "Permission sets" generally refer to groups of permissions that may be assigned to users of such a computing environment. For instance, the assignments of users and permission sets may be stored in one or more databases of System 816. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model users at one permission level may have access to applications, data, and database information accessible by a lower permission level user, but may not have access to certain applications, database information, and data accessible by a user at a higher permission level.

As discussed above, system 816 may provide on-demand database service to user systems 812 using an MTS arrangement. By way of example, one tenant organization may be a company that employs a sales force where each salesperson uses system 816 to manage their sales process. Thus, a user in such an organization may maintain contact data, leads data, customer follow-up data performance data, goals and progress data, etc., all applicable to that user's personal sales process (e.g., in tenant data storage 822). In this arrangement, a user may manage his or her sales efforts and cycles from a variety of devices, since relevant data and applications to interact with (e.g., access, view, modify, report, transmit, calculate, etc.) such data may be maintained and accessed by any user system 812 having network access.

When implemented in an MTS arrangement, system 816 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 816 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 816 may also maintain system-level data usable by multiple tenants or other data. Such system-level data may include industry reports, news, postings, and the like that are sharable between tenant organizations.

In some implementations, user systems 812 may be client systems communicating with application servers 850 to request and update system-level and tenant-level data from system 816. By way of example, user systems 812 may send one or more queries requesting data of a database maintained in tenant data storage 822 and/or system data storage 824. An application server 850 of system 816 may automatically generate one or more SQL statements (e.g., one or more SQL queries) that are designed to access the requested data. System data storage 824 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 9A:
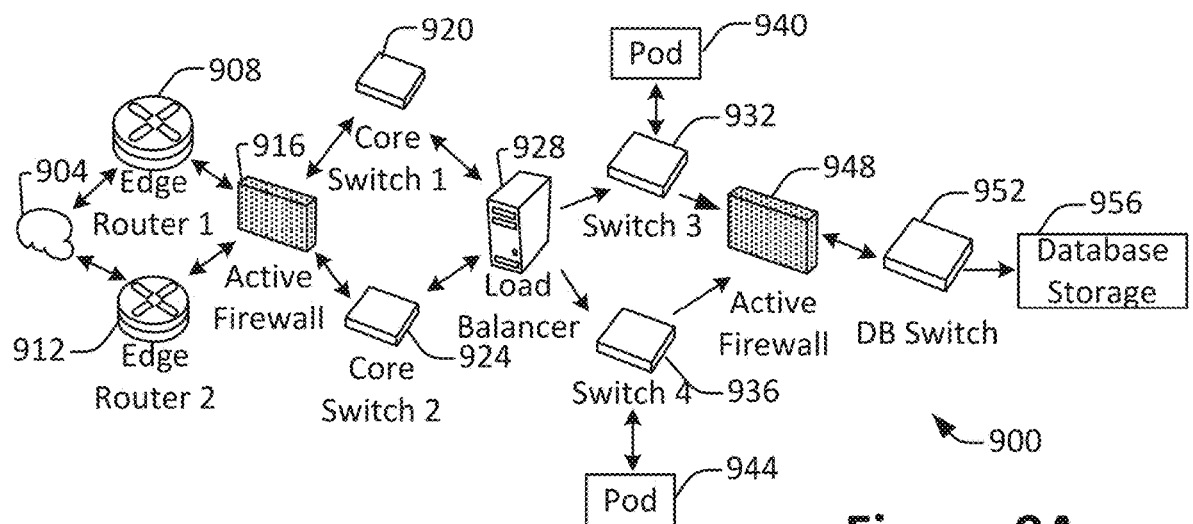
FIG. 9A shows a system diagram of an example of architectural components of an on-demand database service environment, configured in accordance with some implementations.

FIG. 9A shows a system diagram of an example of architectural components of an on-demand database service environment 900, configured in accordance with some implementations. A client machine located in the cloud 904 may communicate with the on-demand database service environment via one or more edge routers 908 and 912. A client machine may include any of the examples of user systems ?12 described above. The edge routers 908 and 912 may communicate with one or more core switches 920 and 924 via firewall 916. The core switches may communicate with a load balancer 928, which may distribute server load over different pods, such as the pods 940 and 944 by communication via pod switches 932 and 936. The pods 940 and 944, which may each include one or more servers and/or other computing resources, may perform data processing and other operations used to provide on-demand services. Components of the environment may communicate with a database storage 956 via a database firewall 948 and a database switch 952.

Accessing an on-demand database service environment may involve communications transmitted among a variety of different components. The environment 900 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 9A and 9B.

The cloud 904 refers to any suitable data network or combination of data networks, which may include the Internet. Client machines located in the cloud 904 may communicate with the on-demand database service environment 900 to access services provided by the on-demand database service environment 900. By way of example, client machines may access the on-demand database service environment 900 to retrieve, store, edit, and/or process CRM information.

In some implementations, the edge routers 908 and 912 route packets between the cloud 904 and other components of the on-demand database service environment 900. The edge routers 908 and 912 may employ the Border Gateway Protocol (BGP). The edge routers 908 and 912 may maintain a table of IP networks or 'prefixes', which designate network reachability among autonomous systems on the internet.

In one or more implementations, the firewall 916 may protect the inner components of the environment 900 from internet traffic. The firewall 916 may block, permit, or deny access to the inner components of the on-demand database service environment 900 based upon a set of rules and/or other criteria. The firewall 916 may act as one or more of a packet filter, an application gateway, a stateful filter a proxy server, or any other type of firewall.

In some implementations, the core switches 920 and 924 may be high-capacity switches that transfer packets within the environment 900. The core switches 920 and 924 may be configured as network bridges that quickly route data between different components within the on-demand database service environment. The use of two or more core switches 920 and 924 may provide redundancy and/or reduced latency.

In some implementations, communication between the pods 940 and 944 may be conducted via the pod switches 932 and 936. The pod switches 932 and 936 may facilitate communication between the pods 940 and 944 and client machines, for example via core switches 920 and 924. Also or alternatively, the pod switches 932 and 936 may facilitate communication between the pods 940 and 944 and the database storage 956. The load balancer 928 may distribute workload between the pods, which may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948, which may act as a computer application firewall operating at the database application layer of a protocol stack. The database firewall 948 may protect the database storage 956 from application attacks such as structure query language (SQL) injection, database rootkits, and unauthorized information disclosure. The database firewall 948 may include a host using one or more forms of reverse proxy services to proxy traffic before passing it to a gateway router and/or may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, the database storage 956 may be an on-demand database system shared by many different organizations. The on-demand database service may employ a single-tenant approach, a multi-tenant approach, a virtualized approach, or any other type of database approach. Communication with the database storage 956 may be conducted via the database switch 952. The database storage 956 may include various software components for handling database queries. Accordingly, the database switch 952 may direct database queries transmitted by other components of the environment (e.g., the pods 940 and 944) to the correct components within the database storage 956.

Figure 9B:
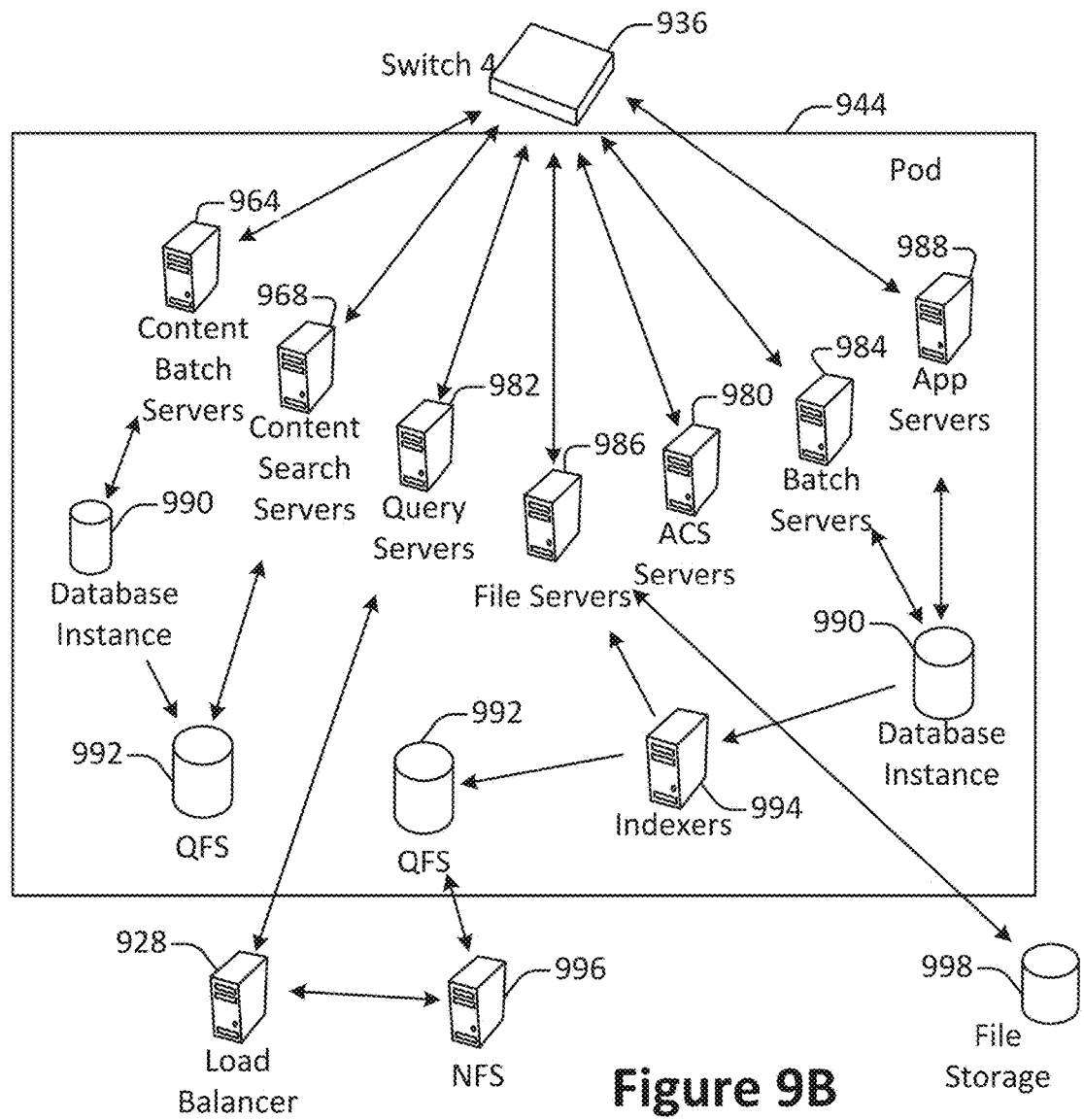
FIG. 9B shows a system diagram further illustrating an example of architectural components of an on-demand database service environment, in accordance with some implementations.

FIG. 9B shows a system diagram further illustrating an example of architectural components of an on-demand database service environment, in accordance with some implementations. The pod 944 may be used to render services to user(s) of the on-demand database service environment 900. The pod 944 may include one or more content batch servers 964, content search servers 968 query servers 982, file servers 986, access control system (ACS) servers 980 batch servers 984 and app servers 988. Also the pod 944 may include database instances 990, quick file systems (QFS) 992, and indexers 994. Some or all communication between the servers in the pod 944 may be transmitted via the switch 936.

In some implementations, the app servers 988 may include a framework dedicated to the execution of procedures (e.g., programs, routines, scripts) for supporting the construction of applications provided by the on-demand database service environment 900 via the pod 944. One or more instances of the app server 988 may be configured to execute all or a portion of the operations of the services described herein.

In some implementations, as discussed above, the pod 944 may include one or more database instances 990. A database instance 990 may be configured as an MTS in which different organizations share access to the same database, using the techniques described above. Database information may be transmitted to the indexer 994, which may provide an index of information available in the database 990 to file servers 986. The QFS 992 or other suitable filesystem may serve as a rapid-access file system for storing and accessing information available within the pod 944. The QFS 992 may support volume management capabilities, allowing many disks to be grouped together into a file system. The QFS 992 may communicate with the database instances 990, content search servers 968 and/or indexers 994 to identify, retrieve, move, and/or update data stored in the network file systems (NFS) 996 and/or other storage systems.

In some implementations, one or more query servers 982 may communicate with the NFS 996 to retrieve and/or update information stored outside of the pod 944. The NFS 996 may allow servers located in the pod 944 to access information over a network in a manner similar to how local storage is accessed. Queries from the query servers 922 may be transmitted to the NFS 996 via the load balancer 928 which may distribute resource requests over various resources available in the on-demand database service environment 900. The NFS 996 may also communicate with the QFS 992 to update the information stored on the NFS 996 and/or to provide information to the QFS 992 for use by servers located within the pod 944.

In some implementations, the content batch servers 964 may handle requests internal to the pod 944. These requests may be long-running and/or not tied to a particular customer, such as requests related to log mining, cleanup work, and maintenance tasks. The content search servers 968 may provide query and indexer functions such as functions allowing users to search through content stored in the on-demand database service environment 900. The file servers 986 may manage requests for information stored in the file storage 998, which may store information such as documents, images, basic large objects (BLOBs), etc. The query servers 982 may be used to retrieve information from one or more file systems. For example, the query system 982 may receive requests for information from the app servers 988 and then transmit information queries to the NFS 996 located outside the pod 944. The ACS servers 980 may control access to data, hardware resources, or software resources called upon to render services provided by the pod 944. The batch servers 984 may process batch jobs, which are used to run tasks at specified times. Thus, the batch servers 984 may transmit instructions to other servers, such as the app servers 988, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 10:
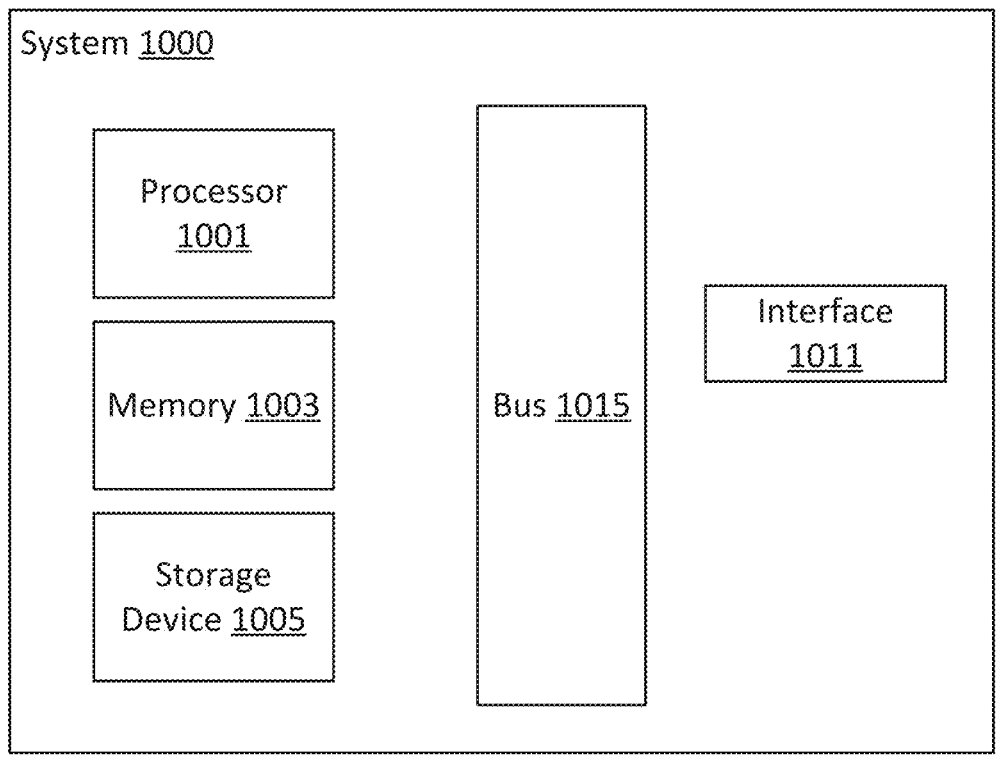
FIG. 10 illustrates one example of a computing device, configured in accordance with one or more embodiments.

FIG. 10 illustrates one example of a computing device. According to various embodiments, a system 1000 suitable for implementing embodiments described herein includes a processor 1001, a memory module 1003, a storage device 1005, an interface 1011, and a bus 1015 (e.g., a PCI bus or other interconnection fabric.) System 1000 may operate as variety of devices such as an application server, a database server, or any other device or service described herein. Although a particular configuration is described, a variety of alternative configurations are possible. The processor 1001 may perform operations such as those described herein. Instructions for performing such operations may be embodied in the memory 1003, on one or more non-transitory computer readable media, or on some other storage device. Various specially configured devices can also be used in place of or in addition to the processor 1001. The interface 1011 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein but should be defined only in accordance with the claims and their equivalents.

The invention claimed is:

1. A computer-implemented method comprising:
receiving a request to relocate source data within a distributed database system arranged in a hierarchy composed of a plurality of levels, the plurality of levels including a local level that includes a plurality of pods, the plurality of pods being end points in the hierarchy, the data being stored at a source pod, the request identifying a designated level in the hierarchy at which to relocate the source data;
identifying a replication policy associated with the source data, the replication policy governing the replication of data between different pods within the hierarchy;
selecting a target pod within the distributed database system based on the replication policy by applying a hierarchically consistent hashing function to an identifier associated with the source data to determine a target pod identifier, the hierarchically consistent hashing function producing values that map to locations on a consistent hash ring, the source pod and the target pod located remotely from one another at the designated level in the hierarchy;
replicating the data to the target pod via a local change bus in communication with the source pod, the local change bus capturing changes made to data stored in the source pod, the local change bus transmitting the captured changes to the target pod via the hierarchy; and
transitioning the replicated data on the target pod to an activated state in which the target pod processes requests associated with the source data and transitioning the source data on the source pod to a deactivated state in which the source pod does not process requests associated with the source data.

2. The computer-implemented method recited in claim 1, wherein the distributed database system is configured to store data associated with a plurality of database tenants.

3. The computer-implemented method recited in claim 2, wherein the source data is associated with a designated one of the database tenants.

4. The computer-implemented method recited in claim 1, wherein the local level is specific to a designated data center.

5. The computer-implemented method recited in claim 4, wherein the plurality of levels includes a global level, a regional level, and a local level, and wherein the global level includes a plurality of geographic regions, and wherein each geographic region includes a plurality of data centers.

6. The computer-implemented method recited in claim 5, wherein the designated data center includes a local replication policy node, the local replication policy node configured to determine whether the source pod and the target pod are located in different data centers.

7. The computer-implemented method recited in claim 6, wherein the source pod and the target pod are located in different data centers within the same region.

8. The computer-implemented method recited in claim 7, wherein transmitting the captured changes to the target pod via the hierarchy comprises transmitting the captured changes to a regional replication policy node.

9. A distributed database system configured to perform a method comprising:
receiving a request to relocate source data within a distributed database system arranged in a hierarchy composed of a plurality of levels, the plurality of levels including a local level that includes a plurality of pods, the plurality of pods being end points in the hierarchy, the data being stored at a source pod, the request identifying a designated level in the hierarchy at which to relocate the source data;
identifying a replication policy associated with the source data, the replication policy governing the replication of data between different pods within the hierarchy;
selecting a target pod within the distributed database system based on the replication policy by applying a hierarchically consistent hashing function to an identifier associated with the source data to determine a target pod identifier, the hierarchically consistent hashing function producing values that map to locations on a consistent hash ring, the source pod and the target pod located remotely from one another at the designated level in the hierarchy;
replicating the data to the target pod via a local change bus in communication with the source pod, the local change bus capturing changes made to data stored in the source pod, the local change bus transmitting the captured changes to the target pod via the hierarchy; and
transitioning the replicated data on the target pod to an activated state in which the target pod processes requests associated with the source data and transitioning the source data on the source pod to a deactivated state in which the source pod does not process requests associated with the source data.

10. The distributed database system recited in claim 9, wherein the distributed database system is configured to store data associated with a plurality of database tenants, wherein the source data is associated with a designated one of the database tenants, and wherein selecting the target pod comprises applying a hashing function to an identifier associated with the source data.

11. The distributed database system recited in claim 9, wherein the local level is specific to a designated data center, wherein the plurality of levels includes a global level, a regional level, and a local level, and wherein the global level includes a plurality of geographic regions, and wherein each geographic region includes a plurality of data centers.

12. The distributed database system recited in claim 11, wherein the designated data center includes a local replication policy node, the local replication policy node configured to determine whether the source pod and the target pod are located in different data centers, wherein the source pod and the target pod are located in different data centers within the same region, and wherein transmitting the captured changes to the target pod via the hierarchy comprises transmitting the captured changes to a regional replication policy node.

13. One or more non-transitory computer readable media having instructions stored thereon for performing a method, the method comprising:

receiving a request to relocate source data within a distributed database system arranged in a hierarchy composed of a plurality of levels, the plurality of levels including a local level that includes a plurality of pods, the plurality of pods being end points in the hierarchy, the data being stored at a source pod, the request identifying a designated level in the hierarchy at which to relocate the source data;

identifying a replication policy associated with the source data, the replication policy governing the replication of data between different pods within the hierarchy;

selecting a target pod within the distributed database system based on the replication policy by applying a hierarchically consistent hashing function to an identifier associated with the source data to determine a target pod identifier, the hierarchically consistent hashing function producing values that map to locations on a consistent hash ring, the source pod and the target pod located remotely from one another at the designated level in the hierarchy;

replicating the data to the target pod via a local change bus in communication with the source pod, the local change bus capturing changes made to data stored in the source pod, the local change bus transmitting the captured changes to the target pod via the hierarchy; and transitioning the replicated data on the target pod to an activated state in which the target pod processes requests associated with the source data and transitioning the source data on the source pod to a deactivated state in which the source pod does not process requests associated with the source data.

14. The one or more non-transitory computer readable media recited in claim 13, wherein the distributed database system is configured to store data associated with a plurality of database tenants, and wherein the source data is associated with a designated one of the database tenants.

* * * * *